US006502077B1

(12) United States Patent
Speicher

(10) Patent No.: US 6,502,077 B1
(45) Date of Patent: *Dec. 31, 2002

(54) INTERNET-AUDIOTEXT ELECTRONIC ADVERTISING SYSTEM WITH INVENTORY MANAGEMENT

(76) Inventor: Gregory J. Speicher, 651F Lakeview Plaza Blvd., Worthington, OH (US) 43085

( * ) Notice: Subject to any disclaimer, the term of this patent is extended or adjusted under 35 U.S.C. 154(b) by 0 days.

This patent is subject to a terminal disclaimer.

(21) Appl. No.: 09/549,885

(22) Filed: Apr. 17, 2000

Related U.S. Application Data

(63) Continuation of application No. 08/799,539, filed on Feb. 12, 1997, now Pat. No. 6,064,967, which is a continuation-in-part of application No. 08/744,879, filed on Nov. 8, 1996, now abandoned.

(51) Int. Cl.[7] .............................................. G06F 17/60
(52) U.S. Cl. ........................................... 705/14; 705/1
(58) Field of Search ............................... 705/1, 14, 26, 705/28, 16, 27; 379/67.1, 68, 88.07, 88.17

(56) References Cited

U.S. PATENT DOCUMENTS

| | | | | |
|---|---|---|---|---|
| 4,847,890 A | * | 7/1989 | Solomon et al. ............... 379/67 |
| 4,979,216 A | * | 12/1990 | Malsheen et al. .............. 381/52 |
| 5,283,731 A | * | 2/1994 | Lalonde et al. .............. 364/401 |
| 5,524,137 A | * | 6/1996 | Rhee ............................. 379/67 |
| 5,533,102 A | * | 7/1996 | Robinson et al. .............. 379/67 |
| 5,737,395 A | * | 4/1998 | Irribarren ...................... 379/88 |
| 5,768,348 A | * | 6/1998 | Solomon et al. ............... 379/67 |
| 5,794,210 A | * | 8/1998 | Goldhaber et al. ........... 705/14 |
| 5,848,396 A | * | 12/1998 | Gerace ......................... 705/10 |
| 5,857,175 A | * | 1/1999 | Day et al. ..................... 705/14 |

FOREIGN PATENT DOCUMENTS

WO    WO 960556 A1  *  2/1996

OTHER PUBLICATIONS

Norton, Debbie, "Corporate profile for singles on–line inc.", Nov. 1, 1996, Business wire (San Francisco, CA), p. 1.*

* cited by examiner

Primary Examiner—Jeffrey D. Carlson
(74) Attorney, Agent, or Firm—Ward & Olivo

(57) ABSTRACT

The present invention relates to an electronic advertising system. More specifically, the present invention creates a means to select ads for publication in the newspaper based on past performance of individual personal ads, thus attempting to optimize the number of responses to the printed personal ad column as a whole. At the same time, all personal ads are published on the Internet so as to accommodate all advertisers regardless of the past performance of their ad. Finally, by fully integrating the Internet personal ads service with the audiotex personal ad service, advertisers whose ad only is published on the Internet are in no way disadvantaged by fewer features or options.

25 Claims, 12 Drawing Sheets

AD PERSONAL TABLE  FIG. 2

| FIELD NAME | REF. # | DESCRIPTION |
|---|---|---|
| AD_MAILBOX_NUMBER | 201 | THE FIVE DIGIT MAILBOX NUMBER ASSIGNED TO AN ADVERTISER. THE MAILBOX NUMBER IS USED AS AN ELECTRONIC MAILBOX FOR MULTIMEDIA RESPONSES. |
| AD_PASSWORD | 202 | AN ADVERTISER'S 5 DIGIT PASSWORD |
| AD_PHONE | 203 | AN ADVERTISER'S PHONE NUMBER |
| AD_EMAIL_ADDRESS | 204 | THE ELECTRONIC MAILBOX ADDRESS OF AN ADVERTISER. |
| AD_EMAIL_FILENAME | 205 | THE FILENAME OF THE E-MAIL AUDIO FILE RECEIVED FROM AN ADVERTISER |
| AD_DATE | 206 | THE DATE AN AD IS PLACED |
| AD_GENDER | 207 | THE GENDER OF AN ADVERTISER |
| AD_MARITAL_STATUS | 208 | THE MARITAL STATUS OF AN ADVERTISER |
| AD_AGE | 209 | THE AGE OF AN ADVERTISER |
| AD_REVIEW_FLAG | 210 | SET TO FALSE TO INDICATE THAT AN AD NEEDS TO BE REVIEWED. |
| AD_ORIGIN | 211 | INDICATES IF AD ORIGINATES ON THE IVR OR THE IWS |
| AD_RESPONSE_COUNT | 212 | INDICATES THE NUMBER OF RESPONSE AN AD RECEIVES |

AD GREETINGS TABLE  FIG. 3

| FIELD NAME | REF. # | DESCRIPTION |
|---|---|---|
| GR_MAILBOX_NUMBER | 301 | THE FIVE DIGIT MAILBOX NUMBER ASSIGNED TO AN AD. |
| GR_TYPE | 302 | THE TYPE OF GREETING STORED (TEXT, VOX, WAV, REALAUDIO, PHOTO, ETC..). |
| GR_REVIEW_FLAG | 303 | THE FLAG DENOTES IF A FILE HAS BEEN REVIEWED. |
| GR_FILENAME | 304 | THE FILENAME OF A GREETING. |
| GR_DATE_TIME | 305 | DATE AND TIME A GREETING IS POSTED TO THE DATABASE. |
| GR_CONVERSION_FLAG | 306 | SET TO FALSE IF A FILE REQUIRES CONVERSION TO ANOTHER FORMAT. |

AD RESPONSE TABLE  FIG. 4

| FIELD NAME | REF. # | DESCRIPTION |
|---|---|---|
| RSP_MAILBOX_NUMBER | 501 | THE FIVE DIGIT MAILBOX NUMBER OF THE AD RESPONDED TO. THE MAILBOX NUMBER IS ALSO USED ELECTRONIC MAIL ADDRESS FOR MULTIMEDIA RESPONSES. |
| RSP_DATE_TIME | 503 | THE DATE AND TIME A RESPONSE IS MADE. |
| RSP_TYPE | 504 | THE TYPE OF RESPONSE FILE (TEXT, VOX, WAV, REALAUDIO, ETC..). |
| RSP_FILENAME | 505 | THE FILENAME OF A RESPONSE. |
| RSP_CONVERSION_FLAG | 506 | SET TO FALSE IF A FILE REQUIRES CONVERSION TO ANOTHER FORMAT. |

FIG. 8

OUTGOING AND FUN          87654

I AM A SINGLE WHITE FEMALE, AGE 25, WHO ENJOYS MOVIES, DINING OUT, TRAVEL AND THE OUTDOORS. I WORK AS A SECRETARY AT A LAW OFFICE AND LOVE MY JOB. I'M LOOKING FOR AN ATTRACTIVE SINGLE WHITE MALE, AGE 25 TO 30, FOR FRIENDSHIP AND POSSIBLE ROMANCE.

 2001

URBAN COWBOY          67672

I AM A SINGLE WHITE MALE WHO LOVES COUNTRY MUSIC AND THE OUTDOORS. I HAVE A SMALL HORSE FARM OUTSIDE OF TOWN I WOULD LOVE TO SHOW THAT SPECIAL SOMEONE. I ALSO ENJOY COOKING, HIKING, SWIMMING, AND TENNIS. I'M LOOKING FOR SOMEONE WITH SIMILAR INTERESTS.

2003

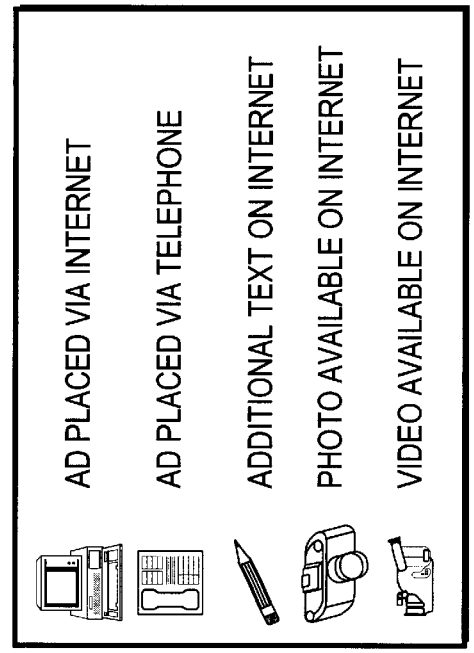

- AD PLACED VIA INTERNET
- AD PLACED VIA TELEPHONE
- ADDITIONAL TEXT ON INTERNET
- PHOTO AVAILABLE ON INTERNET
- VIDEO AVAILABLE ON INTERNET

 2004

NICE GUYS FINISH FIRST     45378

I AM A DIVORCED BLACK MALE, AGE 40, AND AM NEW TO THE AREA. I WAS RECENTLY TRANSFERRED HERE BY MY COMPANY AND AM LOOKING FOR A NEW FRIEND. I'M SEEKING A NICE BLACK FEMALE WHO CAN SHOW ME AROUND.

 2002

2005

INTERNET-AUDIOTEXT ELECTRONIC ADVERTISING SYSTEM WITH INVENTORY MANAGEMENT

This application is a continuation of Ser. No. 08/799,539 filed Feb. 12, 1997 now U.S. Pat. No. 6,064,967, which is a continuation-in-part of Ser. No. 08/744,879, filed Nov. 8, 1996 now abandoned.

TECHNICAL FIELD OF THE INVENTION

The present invention relates to audiotext systems designed to provide full access to traditional databases and telecommunications systems, such as local area networks, the Internet, other external databases, telephones and fax machines, etc., and more specifically to audiotext personal ad services.

BACKGROUND OF THE INVENTION

Audiotext personal ad services are a popular way for people to meet, and are available in most newspapers and on many cable television systems. In a typical service, an advertiser calls a live operator and places a text personal ad. An advertiser then calls an audiotext system and records an audio message, often referred to as a greeting, which expands upon the advertiser's text ad by describing in more detail the advertiser and the type of person he is seeking. Personal ads are then published in a newspaper. A personal ad includes a 900 telephone number and an ad mailbox number permitting a caller to listen to an advertiser's voice greeting. A caller can respond to an ad by recording a reply voice mail message for the advertiser. An advertiser retrieves a message by calling the audiotext system and entering a password given at the time of ad placement. In another format, live operators are not used. Instead, an advertiser first records an audio greeting via a telephone. An operator then listens to the audio greeting off-line and writes a text summary of the audio greeting for publication in the newspaper.

With the expansion of the Internet and other on-line services, personal ad services have been created to take advantage of this new medium. A typical service allows an advertiser to place a text personal ad that is published on the Internet on an HTML (HyperText Markup Language) page. An Internet user may respond to a personal ad by sending an advertiser a message via electronic mail. The limitation of this approach is that an Internet user cannot listen to an audio recording of an advertiser, a feature that is the central to audiotext personal ad services. Another limitation is that many people do not have Internet access, thus limiting the number of advertisers and respondents.

In another format, an attempt is made to integrate audiotext personal ads services with the Internet. Using this approach, personal ads are published in both the newspaper and on the Internet. Each personal ad includes a 900 telephone number and an ad mailbox number permitting a caller to listen to an advertiser's voice greeting. This approach still has the disadvantage of not allowing an Internet user to listen to an advertiser's voice greeting via the Internet. Moreover, an Internet user can only respond to a personal ad via a telephone because this approach does not allow Internet users to exchange messages with telephone users.

To summarize, existing Internet personal ad services are limited in that they lack many of the features available on audiotext personal ad services. Also, existing personal ad services do not provide a means for those using an audiotext personal ad service to effectively communicate with those using an Internet personal ad service and visa versa. Therefore, there is a need for a personal ad system that seamlessly integrates an audiotext system with an Internet server, allowing straightforward communication between those using a telephone and those using the Internet. Such a system has been proposed in detail by the present inventor which comprises application Ser. No. 08/744,879. However, there is still the need to address some of the problems inherent in an integrated audiotext and Internet based personal ad service.

Because of their popularity, a personal ad services published by a metropolitan newspaper or cable television system can attract several hundred or more advertisers at any given time. This creates a serious problem for both the media company and the individual advertiser. Because of the costs associated with printing a newspaper, it is not always possible or desirable to publish in the newspaper all the personal ads available at any given time. This practice can, however, lead to disappointment for individual advertisers whose ads are not published. Moreover, because of the costs of publishing personal ads in print or on television, there is a need for newspapers and cable television systems to find ways to maximize the profits of these personal ads services. Since these profits flow from the number of responses an ad receives, the need arises for a system that maximizes the number of responses an ad published in the newspaper receives, while accommodating the needs and desires of individual advertisers.

SUMMARY OF THE INVENTION

The present invention accommodates these competing needs by creating a means to select ads for publication in the newspaper based on past performance of individual personal ads, thus attempting to optimize the number of responses to the printed personal ad column as a whole. At the same time, all personal ads are published on the Internet so as to accommodate all advertisers regardless of the past performance of their ad. Finally, by fully integrating the Internet personal ads service with the audiotext personal ad service, advertisers whose ad only is published on the Internet are in no way disadvantaged by fewer features or options.

BRIEF DESCRIPTION OF DRAWINGS

For a more complete understanding of the present invention, reference is made to the following drawings, in which:

FIG. 2 shows a table of the fields used for storing personal data, including a brief description of the particular fields.

FIG. 3 shows a table of the fields used for storing greetings data, including a brief description of the particular fields.

FIG. 4 shows a table of the fields used for storing response data, including a brief description of the particular fields.

FIG. 8 shows personal ads as they would appear in a local newspaper.

DETAILED DESCRIPTION OF THE PREFERRED EMBODIMENT

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
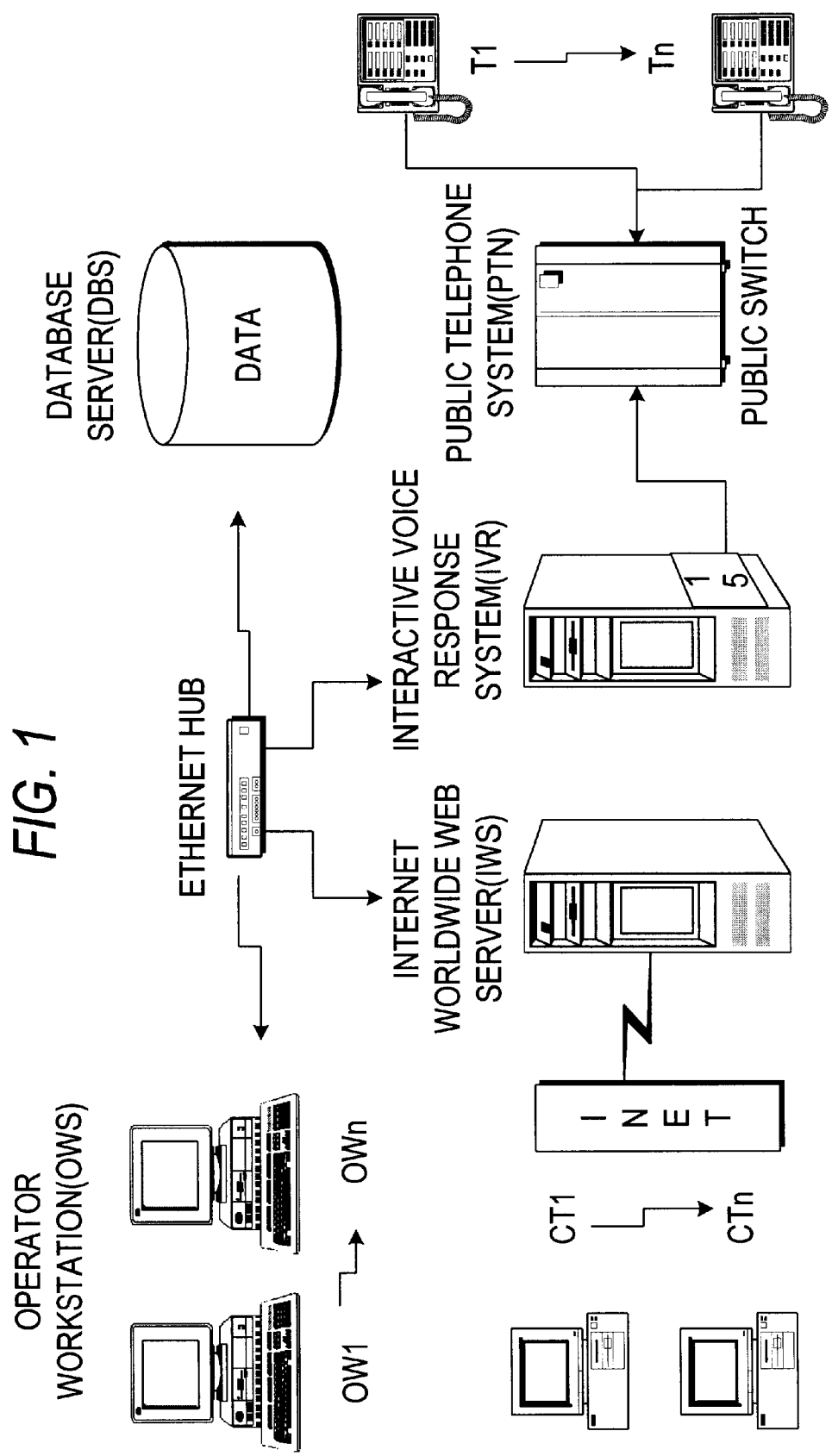
FIG. 1 shows a schematic representation of the present invention.

Referring initially to FIG. 1, a series of remote telephone terminals T1–Tn are represented. In addition, a series of remote computer terminals CT1–CTn are represented. The indicated terminals T1–Tn represent the multitude of telephone terminals existing in association with the public telephone network PTN. The indicated computer terminals CT1–CTn represent the multitude of computer terminals connected to the Internet.

The public telephone network PTN, which accommodates the individual terminals T1–Tn, is coupled to an Interactive Voice Response System IVR. The Internet, which accommodates individual computer terminals CT1–CTn, is coupled to an Internet Web Server IWS. Individual callers use the individual telephone stations T1 through Tn to interface the IVR through the public telephone network PTN. Individual users at computer terminals CT1 through CTn use the Internet to interface the Internet Web Server. Telephone callers and Internet users may record digital audio messages that can be listened to from any of the remote telephone terminals T1–Tn or from any of the remote computer terminals CT1–CTn. Internet users may leave digital text messages that may be accessed from any of the remote telephone terminals T1–Tn using text to speech or from the remote computer terminals CT1–CTn via computer monitor.

Considering the system of FIG. 1 in somewhat greater detail, it is to be understood that the public telephone network has multiplexing capability for individually coupling the terminals T1–Tn to the IVR on request. In the illustrative embodiment of the system, the individual terminals T1–Tn take the form of existing traditional or conventional telephone instruments. It is also to be understood that the Internet has the capability for individually connecting the computer terminals CT1–CTn to the Internet Web Server. In the illustrative embodiment of the system, the individual computer terminals CT1–CTn take the form of personal computers that comprise a central processing unit CPU, modem, monitor, keyboard, hard drive, sound card, speakers, and microphone.

Considering the IVR in somewhat greater detail, the public telephone network PTN is coupled to an IVR FIG. 1. In the disclosed embodiment, from the public telephone network PTN, forty-eight lines are connected to the IVR and, accordingly, the IVR may accommodate up to forty-eight simultaneous calls from the public telephone network PTN. The IVR contains a processor, an exemplary form of which is an Intel 166 MHz Pentium Processor. The forty-eight lines from the public telephone network (PTN) are connected to the processor though an interface 15, an exemplary form of which is a series of commercially available Dialogic (D240SC-T1) cards. The interface incorporates modems, tone decoders, switching mechanisms, DNIS and ANI capability. The Dialogic card stores audio information in the Dialogic .VOX format.

Generally, DNIS capability is a function of the public telephone network PTN to provide digital data indicating the called number. ANI capability is a similar function whereby the digital data indicates the calling number.

Considering the Internet Web Server in somewhat greater detail, the IWS is coupled to the Internet via a DS1 line to a local Internet provider service. The IWS may accommodate a multitude of simultaneous Internet users. As represented, the IWS is a micro computer programmed for Internet information server operations. The IWS contains a processor and Internet server software, exemplary forms of which are an Intel 166 Mhz Pentium Processor and Microsoft Internet Information Server software.

The IWS is also loaded with RealAudio Server software from Progressive Network. RealAudio allows a Microsoft Windows .WAV file to be converted into a RealAudio .RA file, a compressed format that allows play back over the Internet in real time, as opposed to first downloading a file and then listening to it. RealAudio accomplishes this by playing an audio file while it is still downloading, using a process called data streaming.

The IWS is also loaded with VDOLive Server software. VDOLive allows a video clip in the Microsoft Windows AVI, Apple Quicktime, or MPEG video files formats to be converted into a VDOLive .VDO format, a compressed format that allows play back over the Internet in real time, as opposed to first downloading a file and then listening to it. VDOLive also utilizes data streaming.

The IVR and the IWS are coupled to a Database Server DBS via an Ethernet hub as shown in FIG. 1. The system includes one or more Operator Workstations OW1–OWn, through which an operator can interact with and control the DBS, IVR and IWS.

The database server DBS is a computer programmed for database operations. In the illustrated embodiment, the DBS manages a personal Ad Database which is comprised of multiple tables that manage ad creation, the audio greeting files, ad response files, photograph and video files and keyword searching of ads. The Ad Database comprises an electronic equivalent of the personal classified ads placed via telephone and the Internet, and responses placed to ads.

The IVR converts audio files received via telephone into the RealAudio RA format for real time retrieval via the Internet. Conversely, the IWS converts audio files received via the Internet into Dialogic .VOX files for retrieval via telephone. Audio file conversions are done through audio file conversion software, an exemplary form of which is Sound Forge by Sonic Foundry.

The DBS contains a processor and an SQL (Structured Query Language) relational database software, exemplary forms of which are the Intel 166 Mz Pentium Processor and Microsoft SQL Server.

The Operator Workstation OW is a conventional personal computer equipped with a sound card capable of playing the audio data and a video display capable of displaying digitally stored photographs and movies. An exemplary form of the OW is a microcomputer equipped with an Intel 166 Mhz Pentium Processor and a Creative Labs Sound Blaster sound card. Operators review all incoming advertiser files—text, audio, photograph, and video—to insure that their content is appropriate. Also, operators use advertisers' text messages and audio recordings to create summary text ads for publication in a newspaper.

The following sections describe in greater detail the interaction between the IVR, the DBS, the IWS, and the OW.

Placing an Ad Through a Telephone

Figure 5:
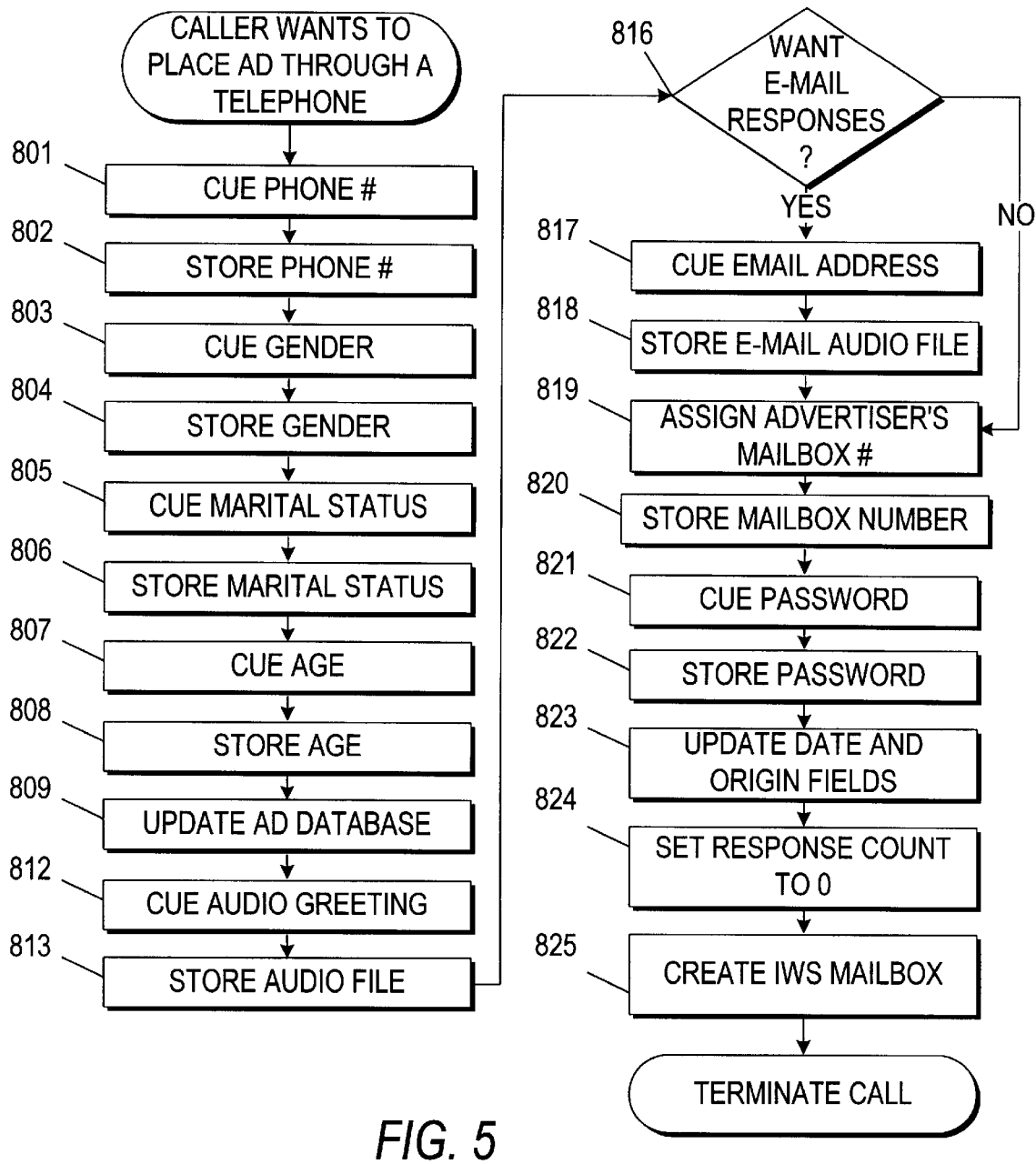
FIG. 5 shows a flow diagram of an exemplary operation of the present invention, more specifically placing an ad through a telephone.

An exemplary operation of the system, with regard to a specific telephone caller placing a personal advertisement will now be treated to accomplish the process as indicated in FIG. 5. First, suppose a telephone caller at terminal T1 makes a call to place a personal advertisement in response to an advertisement in XYZ newspaper. The assumed call involves the telephone caller actuating the buttons to input the number 1 800 555 3333, for example. As a result, signals are provided to the public telephone network resulting in a connection from the remote terminal T1 to the IVR. Using standard DNIS techniques, the IVR associates the called number 1 800 555 3333 with a specific format, for example, a voice personals ad taking format.

The caller is first prompted to create a profile of himself by answering a series of questions using the buttons on his touch tone phone. Referring initially to FIG. 5, upon receiving a call, the IVR cues the caller to enter his telephone number 801. The IVR stores the telephone number 802 in the field AD_PHONE 203. Next, the IVR cues the caller to enter his gender 803. For example: "If you are a woman, press 1. If you are a man, press 2." The IVR stores the caller's gender 804 in the field AD_GENDER 207. Next, the IVR cues the caller for his marital status 805. For example: "If you are single, press 1. If you are divorced, press 2. If you are widowed, press 3." The caller responds and the IVR stores the caller's marital status 806 in the field AD_MARITAL_STATUS 208. Next, the IVR cues the caller for his age 807. For example: "Please enter your age." The caller's age is then stored 808 in the field AD_AGE 209.

Next, the IVR cues the caller to record an audio greeting 812. The advertiser's audio greeting is then stored to a disk file on the IVR 813 and Ad Database is updated 809. Specifically, the AD_REVIEW_FLAG 210 in the AD_PERSONAL_TABLE FIG. 2 is set to FALSE indicating that the ad must be reviewed by an operator. In addition, a new record is created in the AD_GREETINGS_TABLE FIG. 3 and the field GR_REVIEW_FLAG 303 set to FALSE to indicate that the audio greeting has not been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the format of the audio file, and the location of the audio file on the IVR, and the date and time the greeting was recorded. The field GR_TYPE is set to VOX to indicate that the audio recording is in the Dialogic .VOX file format. Finally, the field GR_CONVERSION_FLAG 306 is set to FALSE to indicate that the audio file must be converted from the Dialogic .VOX format to create a new audio file in the RealAudio .RA format for playback on the Internet.

The IVR then cues the caller to indicate if he wishes to record an e-mail address 816. For example: "Press 1 to input an e-mail address. Press 2 to decline." If the caller elects to leave an e-mail address, the IVR cues the caller to record his e-mail address 817. The audio recording is stored to a disk file on the IVR 818 and the field AD_EMAIL_FILENAME 205 in table AD PERSONAL FIG. 2 is set, indicating that an e-mail audio file exists and its location on the IVR.

Next, the IVR assigns the advertiser a five digit mailbox number 819. For example: "Your 5-digit mailbox number is 12345." The mailbox number is then stored 820 in the field AD_MAILBOX_NUMBER 201. The IVR then cues the caller to enter a five digit password 821. The password is stored 822 in the field AD_PASSWORD 202.

In addition, the IVR stores the date the ad is taken in the field AD_DATE_TIME 206, and updates the field AD_ORIGIN 211 to indicate that the personal ad originated on the telephone 823. Also, the value in the field AD_RESPONSE COUNT 212 is set to zero to indicate the number of responses the ad has received 824. Finally, the IVR creates an electronic mailbox for the advertiser on the IWS 825 and stores it in the field AD_MAILBOX_NUMBER 201 to allow respondents to submit audio, video and photographic files in response to the advertiser's ad.

Placing an Ad Through the Internet

Figure 6:
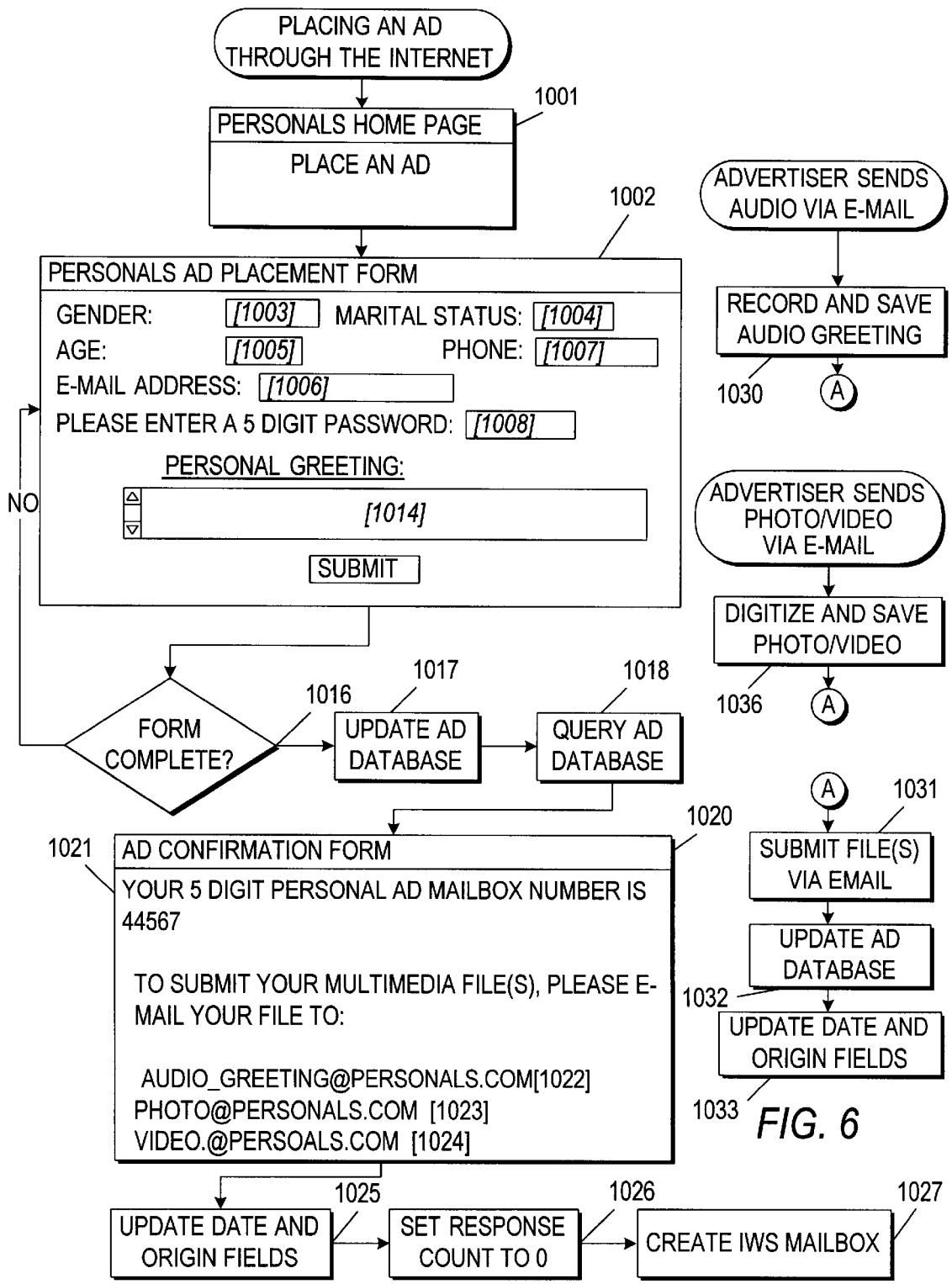
FIG. 6 shows a flow diagram of an exemplary operation of the present invention, more specifically placing an ad through the Internet.

An exemplary operation of the system, with regard to a specific Internet user placing a personal advertisement will now be treated to accomplish the process as indicated in FIG. 6. First, suppose a Internet user at terminal CT1 connects to the Internet to place a personal advertisement in response to an advertisement in XYZ newspaper. The assumed Internet user connects to the Internet and inputs a Uniform Reference Locator URL resulting in a connection from the remote terminal CT1 to a Home Page 1001 on the Internet Web Server.

Referring to FIG. 6, from the Home Page 1001 on the IWS, the Internet user selects an Ad Placement Form 1002. The Ad Placement Form 1002 contains the following input fields corresponding to fields in the Ad database as indicated:

| | |
|---|---|
| Gender 1003 | AD_GENDER 207 |
| Marital Status 1004 | AD_MARITAL_STATUS 208 |
| Age 1005 | AD_AGE 209 |
| E-mail address 1006 | AD_EMAIL_ADDRESS 204 |
| Phone Number 1007 | AD_PHONE 203 |
| Password 1008 | AD_PASSWORD 202 |
| Greeting Text 1014 | GR_FILENAME 304 |

This process largely parallels the process of placing a personal ad via a telephone. The password 1008 is used by the advertiser to retrieve messages and the e-mail address 1006 and telephone number 1007 are used to contact the advertiser. The gender 1003, age 1005, and marital status 1004 fields create a profile of the advertiser. Finally, the field Greeting Text 1014 describes the advertiser and the person she is seeking.

The Internet user completes the Ad Placement Form 1002 and presses the "Submit" button to submit her ad. The form is checked by the IWS for completeness 1016. If the form is incomplete, the user is returned to the Ad Placement Form 1002. If the form is complete, the IWS updates the Ad Database 1017. This includes assigning the user a five digit mailbox number and storing it in the field AD_MAILBOX_NUMBER 201. In addition, the advertiser's profile, contact information, password and greeting are added to the Ad Database. Also, the advertiser's text greeting is stored to a disk file on the IWS. Next, the AD_REVIEW_FLAG 210 in the AD_PERSONAL_TABLE FIG. 2 is set to FALSE indicating that the ad must be reviewed by an operator 10, a new record is created in the AD_GREETINGS_TABLE FIG. 3, and the field GR_REVIEW FLAG 303 is set to FALSE to indicate that the text greeting has not been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the file format, and the location of the text file on the IWS, and the date and time the greeting was placed. Specifically, the field GR_TYPE is set to TEXT. Finally, the field GR_CONVERSION_FLAG 306 is set to TRUE to indicate that the text does not need to be converted to a different format.

Next, the IWS then creates an Ad Confirmation Page 1020. The Ad Confirmation Page 1020 confirms the advertiser's mailbox number 1021, and gives the advertiser an e-mail address to submit an audio greeting 1022, photograph 1023, or video clip 1024 for inclusion with her personal ad. Also, the Internet Web Server stores the date and time the ad is taken in the field AD_DATE_TIME 206, and updates the field AD_ORIGIN 211 to indicate that the personal ad originated on the Internet 1025. In addition, the value in the field AD_RESPONSE COUNT 212 is set to zero to indicate the number of responses the ad has received 1026. Finally, the IWS creates an electronic mailbox for the advertiser 1027, using the mailbox number stored in the field AD_MAILBOX_NUMBER as the electronic mail address, to allow respondents to submit audio, video and photographic files in response to the advertiser's ad.

Enhancing an Internet Ad with Audio, Photograph and Video

A more detailed explanation of how an advertiser submits an audio greeting, photograph, or video clip via CT1 will now be given. To submit an audio greeting, the advertiser first makes an audio recording using a WAV file editor and then saves the file using her five digit mailbox number as the file name 1030 FIG. 7, for example: 44567.wav. The advertiser then submits the audio file using e-mail to an audio greeting electronic mailbox 1031. The advertiser's audio recording is stored to a disk file on the Internet Web Server.

In addition, a new record is created in the AD_GREETINGS_TABLE FIG. 3 and the Ad Database is updated 1032. Specifically, the field GR_REVIEW_FLAG 303 is set to FALSE to indicate that the audio greeting has not been reviewed. Also, the fields GR_MAILBOX_NUMBER 301, GR TYPE 302, GR_FILENAME 304, GR_DATE_TIME 305 in the AD_GREETINGS_TABLE FIG. 3 are also populated to indicate the advertiser's mailbox number, the format of the audio file, and the location of the audio file on the IWS, and the date and time the greeting placed. The field GR_TYPE is set to WAV to indicate that the audio recording is in the Microsoft .WAV file format. Finally, the field GR_CONVERSION_FLAG 306 is set to FALSE to indicate that the audio file must be converted from the Microsoft .WAV format to create two new audio files: one in the RealAudio .RA format for playback on the Internet, and another in the Dialogic .VOX format for playback via the telephone.

To enhance a personal ad with a photograph, the advertiser first digitizes a photograph using a scanner or takes a photograph with a digital camera and then saves the image to a .GIF file using her five digit mailbox number as the file name 1037, for example: 44567.gif. The advertiser then submits the graphic file using e-mail to an photograph electronic mailbox 1031.

The advertiser's photo is stored to a disk file on the IWS and the Ad Database is updated 1032. Specifically, a new record is created in the AD_GREETINGS_TABLE FIG. 3 and the field GR_REVIEW_FLAG 303 set to FALSE to indicate that the graphic file has not been reviewed. In each new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the format of the graphic file, and the location of the graphic file on the IWS, and the date and time the photograph was received. The field GR_TYPE 302 is set to .GIF to indicate that the graphic file is in the GIF file format. Finally, the field GR_CONVERSION_FLAG 306 is set to TRUE to indicate that no file conversion is necessary as .GIF is the graphic file format used by the IWS. If other graphic formats were accepted, they might have to be converted to a .GIF format, depending on the file formats supported by the IWS. If file conversion were necessary, the field GR_CONVERSION_FLAG 306 would be set to FALSE.

To enhance a personal ad with video, the advertiser first digitizes a video clip and then saves the image to a Microsoft .AVI file using her five digit mailbox number as the file name 1036, for example: 44567.avi. Other video formats such as Apple Quicktime, or MPEG video could also be used. The advertiser then submits the graphic file using e-mail to an electronic mailbox 1031.

The advertiser's video clip is stored to a disk file on the IWS and the Ad Database is updated 1032. Specifically, a new record is created in the AD_GREETINGS table FIG. 3 and the field GR_REVIEW_FLAG 303 set to FALSE to indicate that the video file has not been reviewed. In each new record, the fields GR_MAILBOX_NUMBER 301, GR_TYPE 302, GR_FILENAME 304, GR_DATE_TIME 305 in the table AD_GREETINGS FIG. 3 are populated to indicate the advertiser's mailbox number, the format of the video file, and the location of the video file on the IWS, and the date and time the video was received. Specifically, the field GR_TYPE 302 is set to AVI to indicate that the video clip is in the Microsoft .AVI file format. Finally, the field GR_CONVERSION_FLAG 306 is set to FALSE to indicate that the video file must be converted to the VDOLive format for real time playback on the Internet.

Reviewing and Summarizing Ads

All new personal ads are reviewed by an operator at an Operator Workstation to insure that their content is appropriate. Also, each greeting submitted by an advertiser, whether it be an audio greeting recorded by an advertiser via a telephone or a text greeting placed by an advertiser via the Internet, is summarized by an operator to create a twenty word classified text ad for publication in a newspaper. The twenty word limit is a function of newspaper imposed space limitations. It should be noted that space limitations, if they exist at all, may vary widely from newspaper to newspaper. In another format, text ads that are published in the newspaper are first placed with a live operator via a telephone, precluding the need to summarize an audio recording.

Figure 7:
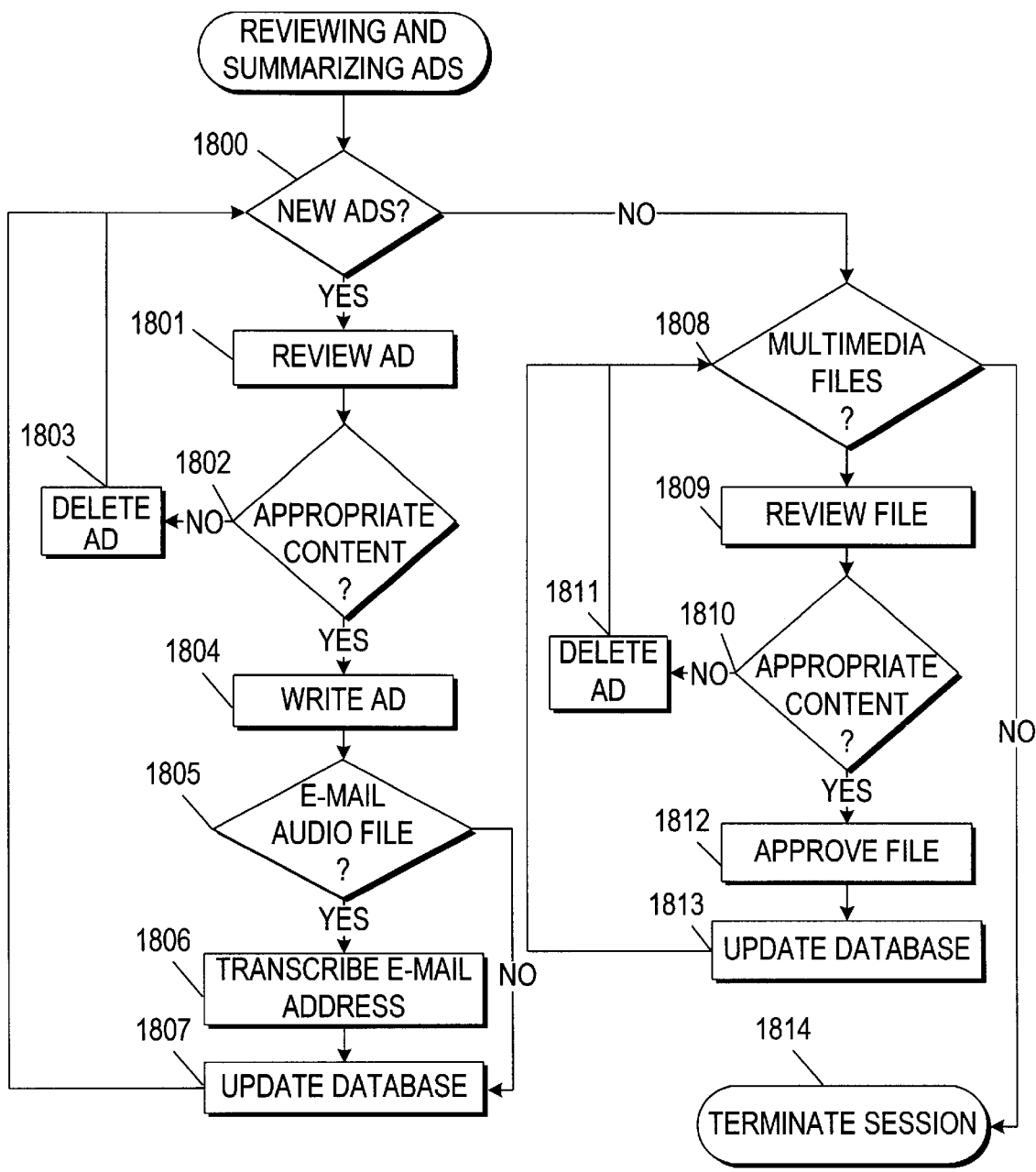
FIG. 7 shows a flow diagram of an exemplary operation of the process of reviewing and summarizing ads as accomplished by the present invention.

An exemplary operation of the process of reviewing and summarizing ads with regard to a specific operator at OW1 will now be treated to accomplish the process as indicated in FIG. 7. The operator first queries the Ad Database to determine if there are new ads to review 1801. Specifically, the query looks for all ads in the AD_PERSONAL table FIG. 2 where the field AD_REVIEW_FLAG 210 is set to FALSE. If the query finds a new ad, the operator first reviews the ad's greeting 1802 as found in the AD_GREETINGS table FIG. 3. If the ad was placed via telephone, this consists of listening to the ad's audio greeting. If the ad was placed via the Internet, this consists of reading the text greeting. The operator then determines if the greeting's contents are appropriate 1803. If the greeting's contents are inappropriate, the ad is deleted and the record purged from the Ad Database 1804 and the operator is returned to block 1800. If the greeting's contents are appropriate, the operator writes a twenty word summary of the greeting 1804. The operator then queries the Ad Database to determine if the advertiser recorded an e-mail address 1805. If an e-mail address audio recording is found, the operator transcribes the e-mail address 1806. The operator then updates the Ad Database 1807.

Specifically, the advertiser's twenty word text summary is stored to a disk file on the IWS. The AD_REVIEW_FLAG 210 in the AD_PERSONAL table FIG. 2 is set to TRUE indicating that the ad has been reviewed. In addition, a new record for the text summary is created in the AD_GREETINGS table FIG. 3 and the field GR_REVIEW_FLAG 303 set to TRUE indicating that the record has been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the file format, and the location of the text file on the IWS, and the date and time. The field GR_TYPE is set to TEXT. Finally, the field GR_CONVERSION_FLAG 306 is set to TRUE to indicate that the text does not need to be converted to a different format.

The operator then returns to block 1800 to continue processing ads. If no new ads are found, the operator queries the Ad Database to determine if any multimedia files (audio, video, or photo) have been submitted via the Internet to enhance a personal ad 1808. Specifically, the query looks for all ads in the AD_PERSONAL table FIG. 2 where the field AD_REVIEW_FLAG 210 is set to TRUE that has files in the AD_GREETING_TABLE FIG. 3 where the GR_REVIEW FLAG 303 is set to FALSE. If the query finds a multimedia file, the operator first reviews the file 1809. If it is an audio file, this consists of listening to the ad's audio greeting. If it is a video or graphic file, this consists of viewing the file. The operator then determines if the greeting's contents are appropriate 1810. If the greeting's contents are inappropriate, the filed is deleted and the record purged from the Ad Database 1811. The operator is then returned to block 1808 to continue processing multimedia files. If the file's contents are appropriate, the operator approves the file 1812 and updates the Ad Database 1813. Specifically, this consists in setting the field GR_REVIEW_FLAG 303 to TRUE to indicate that the file has been reviewed.

If the file is an audio file, the Operator Workstation converts the file to create a new ReaLAudio RA file and stores the file on the IWS. The Operator Workstation also converts the file to create a Dialogic VOX file and stores the file on the IVR. For each new audio file, a new record is created in the AD_GREETINGS table FIG. 2 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the audio file on the IVR. Also, the field GR_REVIEW_FLAG 303 is set to TRUE to indicate that the file has been reviewed. Finally, the field GR_CONVERSION_FLAG is set to TRUE to indicate that the audio file does not need to be converted.

If the file is a video file, the Operator Workstation converts the Microsoft AVI file to create a new VDOLive file and stores the file on the IWS. Also, a new record is created in the AD_GREETINGS table FIG. 2 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the video file on the IVR. Also, the field GR_REVIEW_FLAG 303 is set to TRUE to indicate that the file has been reviewed. Finally, the field GR_CONVERSION_FLAG 306 is set to TRUE to indicate that the video file does not need to be converted.

The operator then returns to block 1808 to continue processing multimedia files. If no new multimedia files are found, the session is terminated 1814.

Publishing Ads using Inventory Managment

An exemplary operation with regard to publishing personal ads in a newspaper will now be treated. Assume XYZ Newspaper offers its readers a personal ad service in which personal ads are published weekly in the newspaper and available twenty-four hours a day on the Internet. Further assume that XYZ newspaper has at any given time several hundred advertisers on the personal ad service but is only able to print one hundred personal ads in the newspaper due to space limitations. The space limitations could be a result of several factors including paper and ink cost, and editorial policy. Because the Internet is not limited in the same way as the newspaper, all the personal ads are published on the Internet. For example, XYZ newspaper allows fifty personal ads from females and fifty personal ads from males to be printed in the newspaper each week. To select which personal ads are published in the newspaper, each week all personal ads are sorted first by gender and second by the number of responses an ad has received, using the values stored in the fields AD_GENDER 207 and AD_RESPONSE_COUNT 212, respectively. The fifty ads in each category that received the most responses are then published in the newspaper. If two or more ads have the same gender and the same number of responses, preference is given to the newer ad, using the time and date as stored in the field AD_DATE 206. FIG. 8 depicts personal ads as they would appear in XYZ newspaper. Icons are included in each ad that represent the origin of an ad (via telephone or via the Internet) and what additional information or multimedia, if any, is available on the Internet. For example, an ad placed via the telephone contains a telephone icon 2001; an ad placed via the Internet contains a computer icon 2002. If there is additional text on the Internet, an ad contains an icon denoting additional text 2004. The presence of a photo or video clip is indicated respectively by a still camera 2004 and video camera 2005 icons.

Responding to an Ad Through a Telephone

Figure 9:
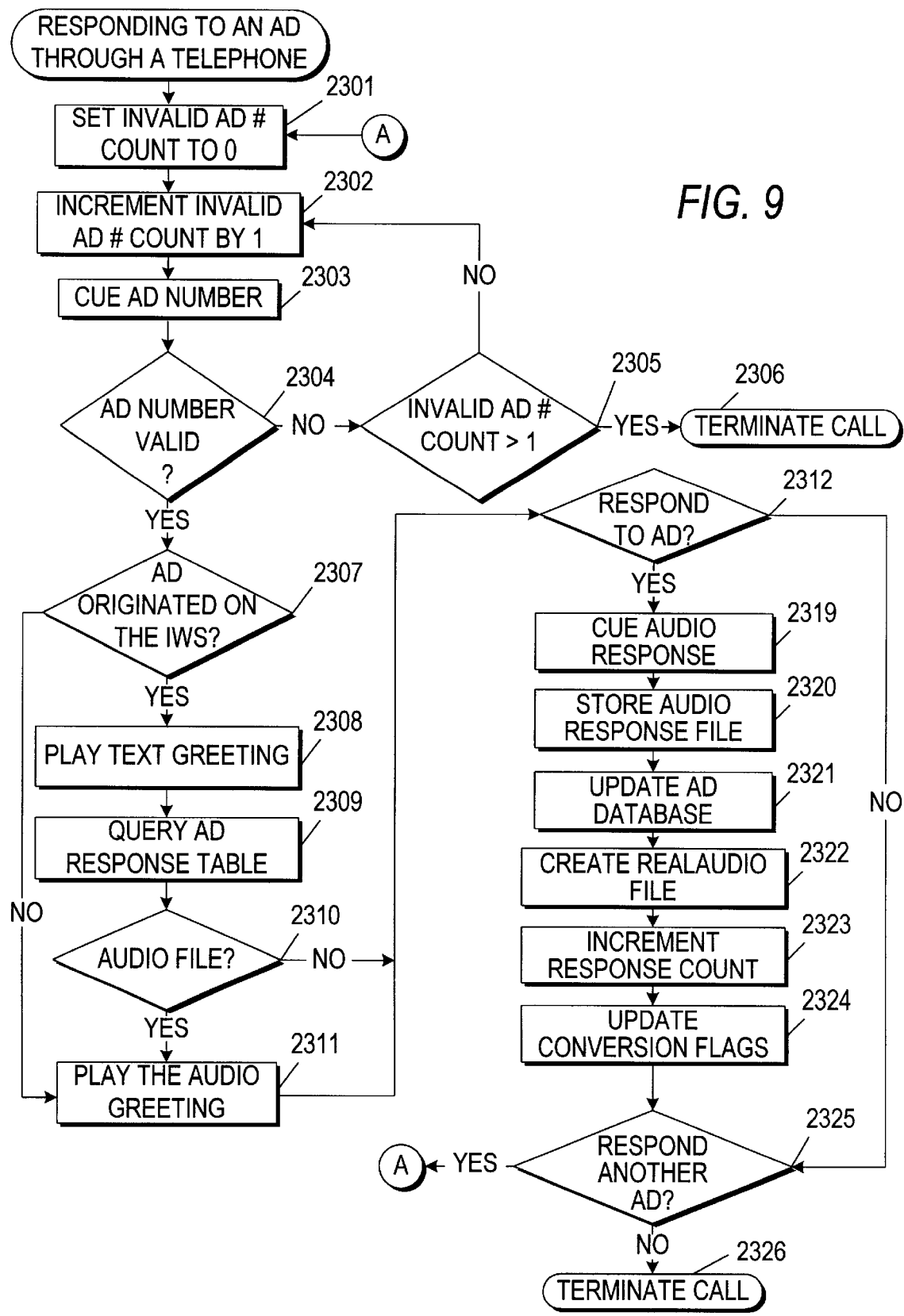
FIG. 9 shows a flow diagram of an exemplary operation of the process of responding to an ad through a telephone as accomplished by the present invention.

An exemplary operation of the system, with regard to a telephone caller responding to a personal advertisement will now be treated to accomplish the process as indicated in FIG. 9. First, suppose a telephone caller at terminal T1 places a call to respond to a personal ad advertised in XYZ newspaper. The assumed call involves the telephone caller actuating the buttons to input the number 1 900 777 3333, for example. As a result, signals are provided to the public telephone network resulting in a connection from the remote terminal T1 to the IVR. Using standard DNIS techniques, the IVR associates the called number 1 900 777 3333 with a specific format, for example, a voice personals response format.

Referring to FIG. 9, upon receiving a call, the IVR sets the "invalid mailbox number count" equal to zero 2301. The IVR then increments the "invalid mailbox number count" by one 2302 and cues the caller for a mailbox number 2303. Upon the caller entering a mailbox number, the IVR queries the field AD_MAILBOX_NUMBER 201 to determine if the mailbox number is valid 2304. If the mailbox number is invalid, the IVR determines if the caller has exceeded the maximum number of attempts allowed 2305. If the caller has exceeded the maximum number of attempts allowed, the call is terminated 2306. If the maximum number of attempts allowed has not been exceeded, the IVR increments the "invalid mailbox number count" by one 2302 and again cues the caller for a mailbox number 2303.

If the mailbox number is valid, the IVR queries the field AD_ORIGIN 211 to determine if the ad originated on the Internet 2307. If the ad originated on the telephone, the IVR plays the ad's audio greeting 2311. If the ad originated on the Internet, the IVR uses text to speech to play the ad's text greeting as placed on the Internet 2308. The IVR then queries the AD_GREETINGS table FIG. 2 to determine if the Internet advertiser also submitted an audio greeting 2309. If the query does not find an audio greeting 2310, the IVR prompts the caller to indicate if he wishes to respond to the ad 2312. If the query finds an audio greeting 2310, the IVR plays the audio greeting 2311. The IVR then prompts the caller to indicate if he wishes to respond to the ad 2312.

If the caller elects not to respond to the ad, he is then prompted to respond to another ad 2325. If the caller chooses to respond to another ad, the IVR continues processing at block 2301, otherwise the call is terminated 2326. If the caller elects to respond to the ad, the IVR cues the caller to record his response 2319. The IVR then stores the response to a disk 2320 file and updates the Ad Database 2321. Specifically, the IVR creates a new record in the AD_RESPONSE table FIG. 5 populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR also creates a new RealAudio. RA file from Dialogic .VOX file and stores the RealAudio file to a disk file on the IWS 2322. The IVR then updates the Ad Database 2323. Specifically, the IVR creates a new record in the AD_RESPONSE table FIG. 5 and populates the fields RSP_MAILBOX_NUMBER 501, RSP_RMAILBOX_NUMBER 502, RSP_DATE_TIME 503, RSP_TYPE 504, and RSP_FILENAME 505 to indicate the mailbox number of the ad responded to, the mailbox number of the respondent, the date and time of the response, the format of the response, and the location of the response file on the IVR. The field RSP_TYPE 504 is set to RA to indicate that the audio recording is in the RealAudio .RA file format. Next, the field RSP_CONVERSION_FLAG 506 is set to TRUE for both the audiotex. VOX file and the RealAudio. RA file to indicate that the audio files do not need to be converted.

Finally, the value in the field AD_RESPONSE_COUNT 212 is incremented by one to indicate that a response has been received 2324.

Responding to an Ad Through the Internet

Figure 10:
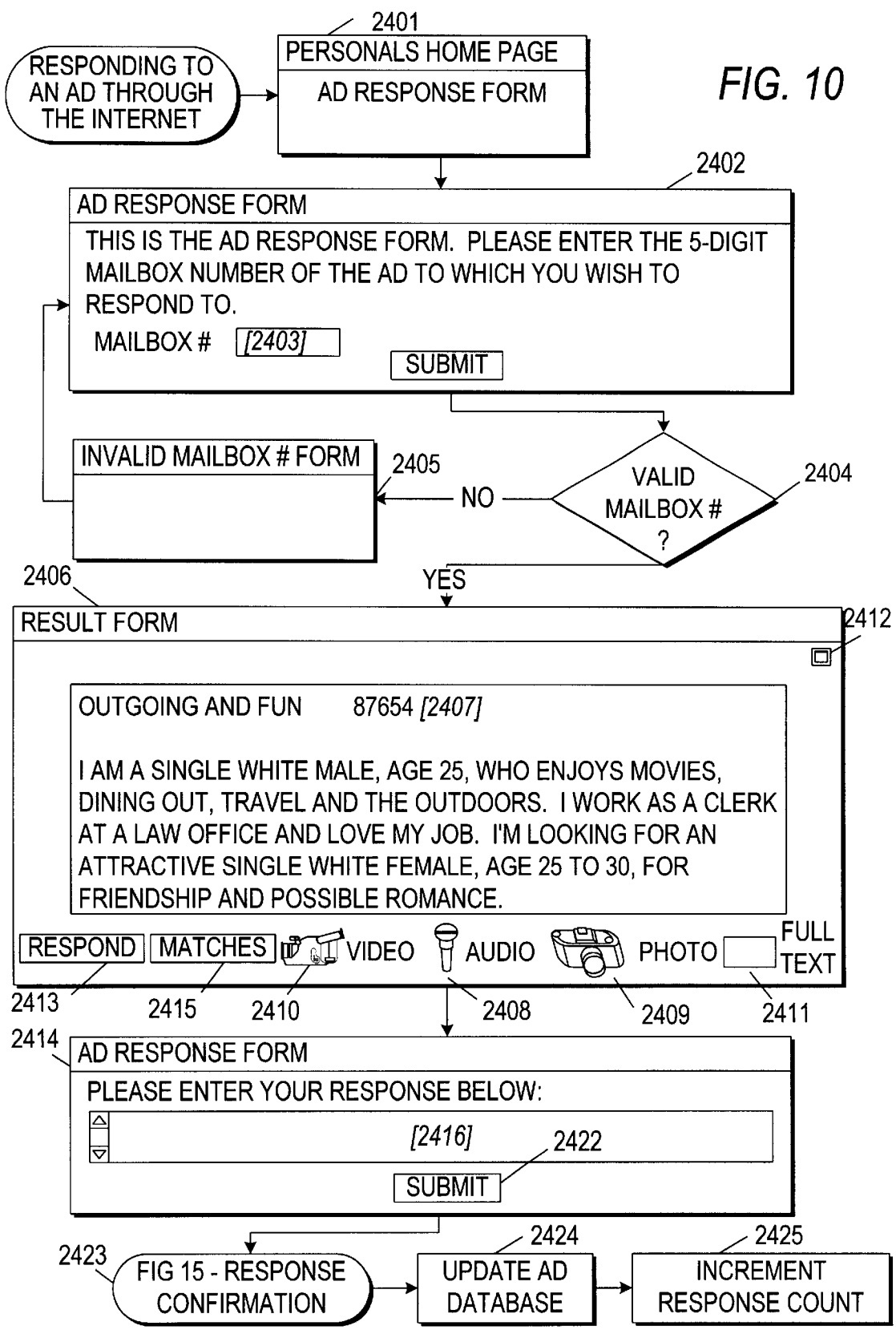
FIG. 10 shows a flow diagram of an exemplary operation of the process of responding to an ad through the Internet as accomplished by the present invention.

An exemplary operation of the system, with regard to a specific Internet user responding to a personal ad via the Internet will now be treated to accomplish the process as indicated in FIG. 10. First, suppose an respondent at terminal CT1 connects to the Internet to respond to a personal advertisement advertised in XYZ newspaper. The assumed Internet user connects to the Internet and inputs a Uniform Reference Locator URL resulting in a connection from the remote terminal CT1 to a Home Page on the Internet Web Server.

Referring to FIG. 10, from the Home Page 2401 on the IWS, the Internet user selects an Ad Response Form 2402. The Ad Response Form instructs the Internet user to enter the five digit mailbox number of the ad she wishes to respond to 2403. Upon the Internet user entering her mailbox number, the IWS queries the field AD_MAILBOX_NUMBER in the Ad Database to determine if the mailbox number is valid 2404. If the mailbox number is invalid, the Internet user is presented with an Invalid Mailbox Number Form 2405.

Figure 11:
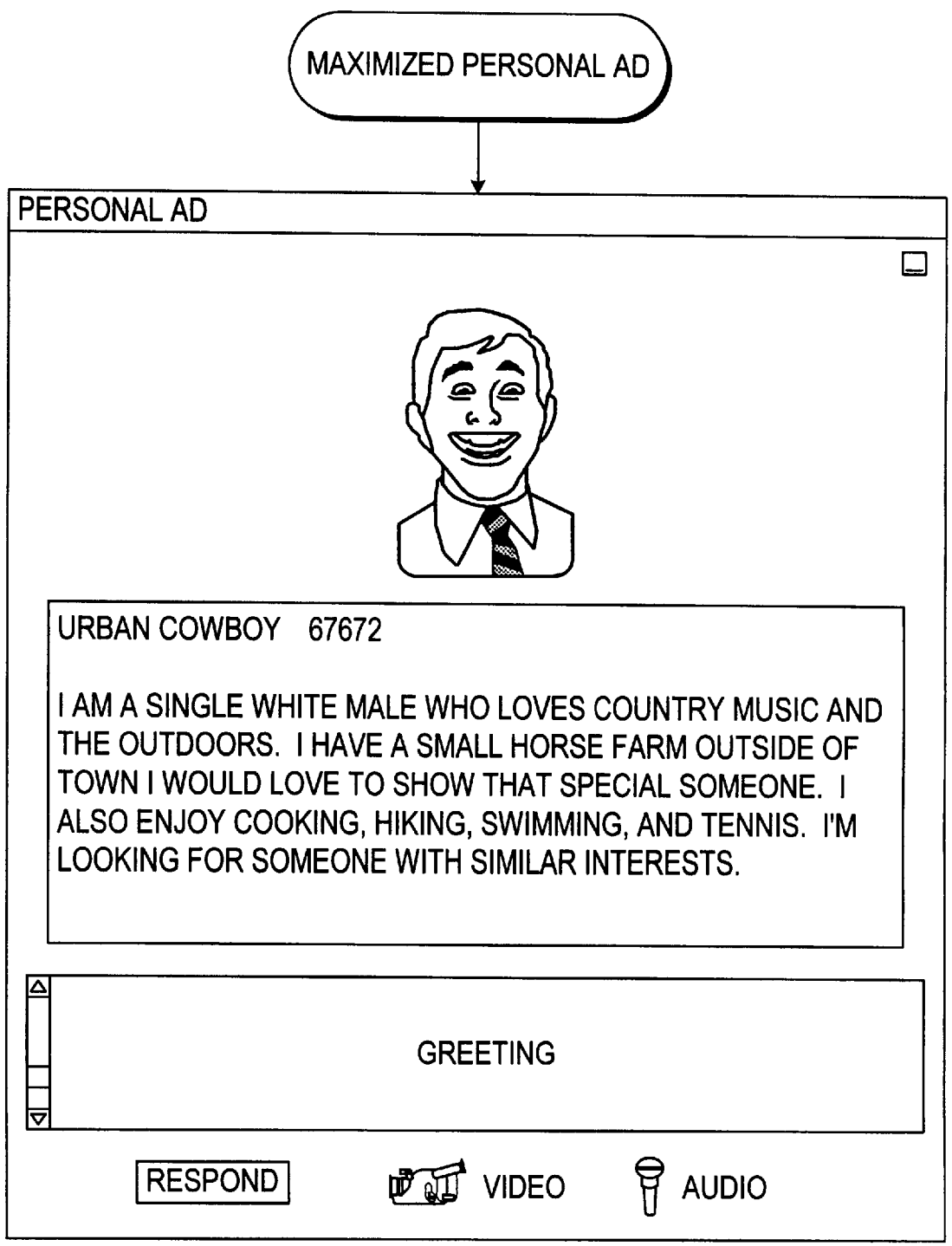
FIG. 11 shows a maximized personal ad as seen by the Internet user who chooses to expand the ad to full-page size.

If the mailbox number is valid, the IWS presents the Internet user with a Results Form 2406. The Results Form 2406 shows the ad the Internet user selected. Specifically, the Results Form shows the twenty word text ad that appears in the newspaper 2407. In addition, the ad contains one or more icons that represent any additional text or multimedia files (audio, video, photograph) for the ad that are available on the IWS. These icons include an audio icon 2408 to denote the ad's audio greeting, a still camera icon 2409 to denote a photograph of the advertiser, a video camera icon 2410 to denote a video clip of the advertiser, or a paper icon 2411 to denote the ad's full text greeting, if the ad was placed on the Internet. It is to be understood that these icons are merely representative and that many other possibilities exist to denote the existence of text and multimedia files. By clicking on an icon, the Internet user can view or listen to the associated file. In addition, by selecting a maximize bar 2412, the Internet user can expand an ad to full page size FIG. 11. The Internet user responds to an ad by selecting the "Respond" button 2413.

When the Internet user selects the respond button, she is presented with an Ad Response Form 2414. The Internet user creates a response by completing a response text field 2416. After completing the Ad Response Form, the Internet user submits the form by pressing the "Submit" button 2422. The respondent is then presented with a Response Confirmation Form 2423. The Response Confirmation Form gives the advertiser information on enhancing her response with an audio message, photograph, or video clip.

The IWS then stores the response to a disk file and updates the Ad Database 2424. Specifically, the IWS creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date and time of the response, the format of the response, and the location of the response file on the IWS. The field RSP_TYPE 504 is set to TEXT. Next, the field RSP_CONVERSION_FLAG 506 is set to TRUE to indicate that the text does not need to be converted to a different format.

Finally, the value in the field AD_RESPONSE_COUNT 212 is incremented by one to indicate that a response has been received 2425.

Enhancing a Response with Audio, Photograph and Video

Figure 12:
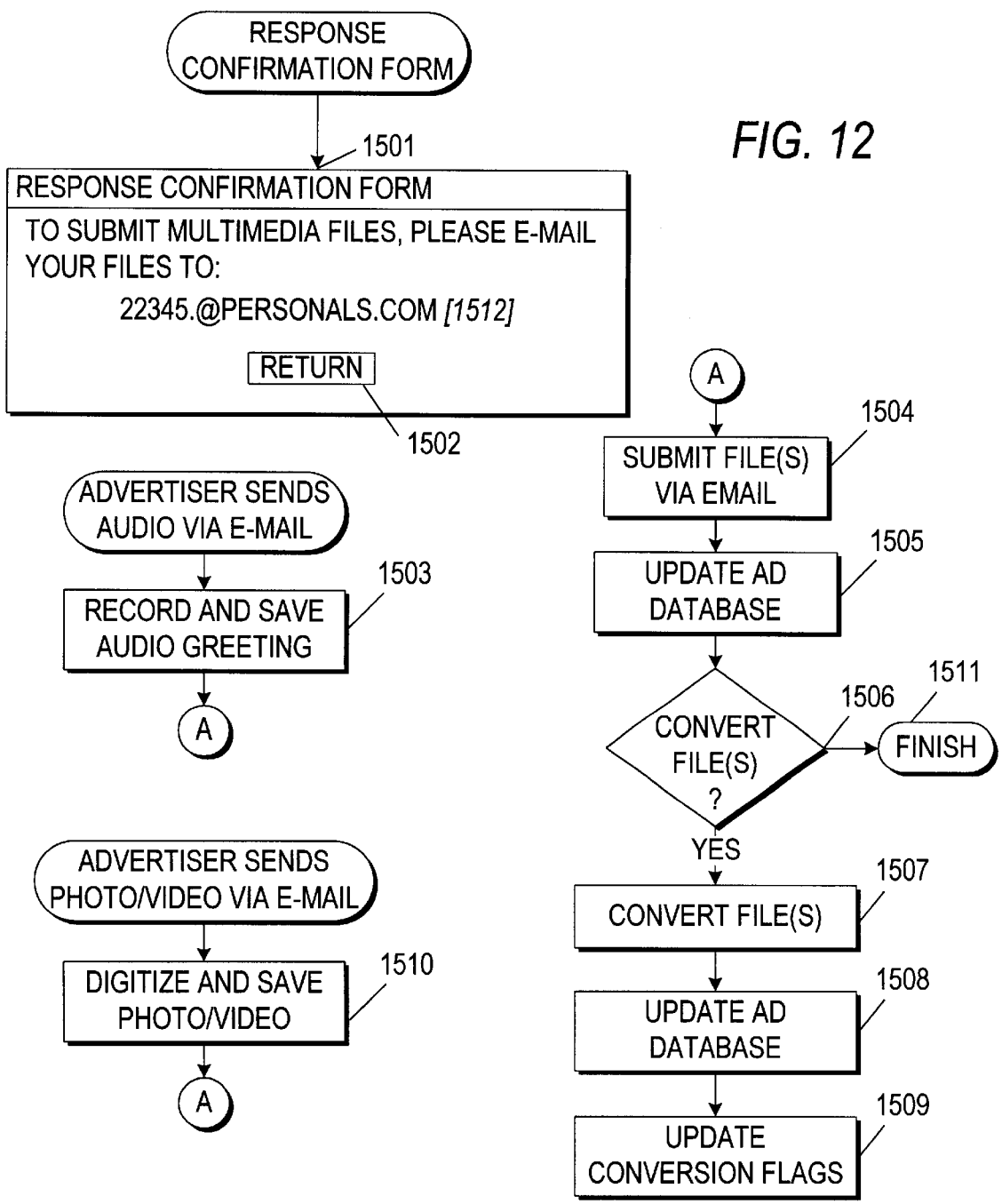
FIG. 12 shows a flow diagram of the response confirmation process, including the Response Confirmation Form which gives the Internet user instructions on how to enhance a response to an ad with, audio, video or a photograph.

As already indicated, after a text response has been submitted via the Internet, the Internet user is shown a Response Confirmation Form FIG. 12 1501. The response confirmation form gives the Internet user instructions on how to enhance a response to an ad with audio, video, or a photograph.

A more detailed explanation of how a respondent submits an audio response, photograph, or video clip via CT1 will now be given. To submit an audio response, the Internet user first makes an audio recording using a WAV file editor and then saves the file using her five digit mailbox number as the file name 1503, for example: 44567.wav. The Internet user then submits the audio file using e-mail to the recipient's electronic mailbox on the IWS 1504, 1512. The Internet user's audio response is stored to a disk file on the IWS and the Ad Database is updated 1505.

Specifically, the IVR creates a new record in the AD_RESPONSE table FIG. 4 and populates the fields RSP_MAILBOX_NUMBER 501, RSP_DATE_TIME 503, RSP_TYPE 504, and RSP_FILENAME 506 to indicate the mailbox number of the ad responded to, the date of the response, the format of the audio file, and the location of the audio file on the IVR. The field RSP_TYPE 504 is set to WAV to indicate that the audio recording is in the Microsoft .WAV file format. Also, the field RSP_CONVERSION_FLAG 506 is set to FALSE to indicate that the audio file must be converted from the Microsoft .WAV format to create two new audio response files: one in the RealAudio .RA format for playback on the Internet, and another in the Dialogic .VOX format for playback via the telephone.

The IWS determines if conversion of audio files is needed 1506, and then creates a new RealAudio .RA file and Dialogic .VOX file from the Microsoft .WAV file 1507. The RealAudio file is stored on the IWS and the Dialogic file is stored on the IVR. The IWS also updates the Ad Database 1508. Specifically, for each new audio file, the IWS creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date of the response, the format of the response, and the location of the response file on the IWS. Finally, the field RSP_CONVERSION_FLAG 506 is set to TRUE for both the source audio file (.WAV) and the target audio files (.VOX and .RA) to indicate that the audio files do not need to be converted 1509.

To send a photograph in response to an ad, the Internet user first digitizes a photograph using a scanner or takes a photograph with a digital camera and then saves the image to a .GIF file using her five digit mailbox number as the file name 1510, for example: 44567.gif. The respondent then submits the graphic file using e-mail to the recipient's electronic mailbox 1504. The respondent's photo is stored to a disk file on the IWS and the Ad Database is updated 1505.

Specifically, the IWS creates a new record in the AD_RESPONSE table FIG. 4 and populates the RSP_MAILBOX_NUMBER 501, RSP_DATE_TIME 503, RSP_TYPE 504, and RSP_FILENAME 505 to indicate the mailbox number of the ad responded to, the date of the response, the file format of the photograph, and the location of the file on the IWS. The field RSP_TYPE 504 is set to .GIF to indicate that the graphic file is in the GIF file format. Finally, the field RSP_CONVERSION_FLAG 506 is set to TRUE to indicate that no file conversion is necessary as .GIF is the graphic file format used by the IWS 1506. It should be noted that file conversion may or may not be necessary depending on what file formats are supported by the IWS and IVR and in what formats the system allows users to submit files.

To send an advertiser a video clip, the Internet user first digitizes a video clip and then saves the image to a Microsoft .AVI file using her five digit mailbox number as the file name 1510, for example: 44567.avi. Other video formats such as Apple Quicktime, or MPEG video could also be used. The respondent then submits the graphic file using e-mail to the recipient's electronic mailbox 1504. The respondent's video is stored to a disk file on the IWS and the AD Database is updated 1505.

Specifically, the IVR creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date of the response, the file format of the video clip, and the location of the video file on the IWS. Specifically, the field RSP_TYPE 504 is set to AVI to indicate that the audio recording is in the Microsoft .AVI file format. Finally, the field RSP_CONVERSION_FLAG 506 is set to FALSE to indicate that the VDOLive file must be converted to the VDOLive format for real time playback on the Internet.

The IWS determines that the video file must be converted to VDOLive format 1506. The IWS creates a new VDOLive file from the Microsoft .AVI file and stores the new file to a disk file 1507 on the IWS and updates the Ad Database 1508. A new record in the AD_RESPONSE table FIG. 4 is created and the IWS populates the RSP_MAILBOX_NUMBER 501, RSP_DATE_TIME 503, RSP_TYPE 504, and RSP_FILENAME 505 fields to indicate the mailbox number of the ad responded to, the date and time of the response, the format of the video file, and the location of the video file on the IWS. Finally, the field RSP_CONVERSION_FLAG 506 is set to TRUE for both record formats (AVI and VDOLive) in the Ad Database to indicate that the video file(s) does not need to be converted 1509.

Retrieving Responses Through a Telephone

Figure 13:
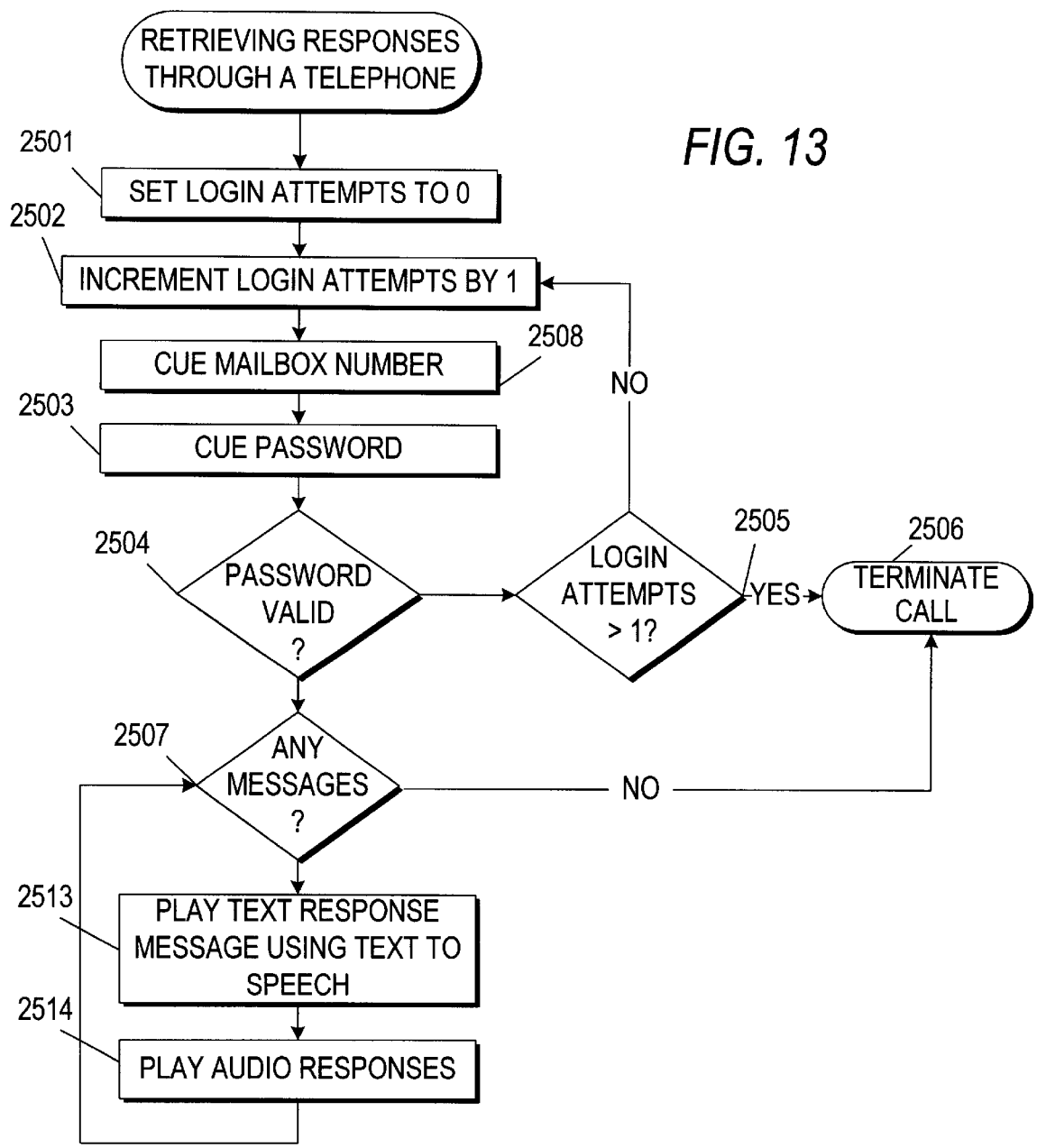
FIG. 13 shows a flow diagram of an exemplary operation of the process of retrieving responses through a telephone as accomplished by the present invention.

An exemplary operation of the system, with regard to an advertiser retrieving responses to his personal ad will now be treated to accomplish the process as indicated in FIG. 13. First, suppose an advertiser at terminal T1 places a call to retrieve messages left in response to his ad. The assumed call involves the advertiser actuating the buttons to input the number 1 900 777 4444, for example. As a result, signals are provided to the public telephone network resulting in a connection from the remote terminal T1 to the IVR. Using standard DNIS techniques, the IVR associates the called number 1 900 777 4444 with a specific format, for example, a message retrieval format.

Referring to FIG. 13, upon receiving a call, the IVR sets the "logon attempts" equal to zero 2501. The IVR then increments the "logon attempts" by one 2502 and cues the caller for a mailbox number and password 2503. The IVR then queries the Ad Database to determine if the mailbox number and password are valid. If the entries are not valid, the IVR determines if the caller has exceeded the maximum, number of logon attempts allowed 2505. If the caller has exceeded the maximum number of logon attempts allowed, the call is terminated 2506. If the maximum number of logon attempts allowed has not been exceeded, the IVR increments the "logon attempts" by one 2502 and again cues the caller for a mailbox number and password 2503.

If the entries are valid, the IVR then queries the AD_RESPONSE table to determine if the advertiser has any responses 2507. If the advertiser has no responses, the call is terminated 2506. If the IVR finds a response, the IVR plays the text 2513 and audio 2514 messages from the respondent. If a response is in text form, the IVR uses text to speech to play the message. If there are additional responses, the caller is returned to block 2513. Otherwise, the call is terminated 2506.

Retrieving Messages Through the Internet

Figure 14:
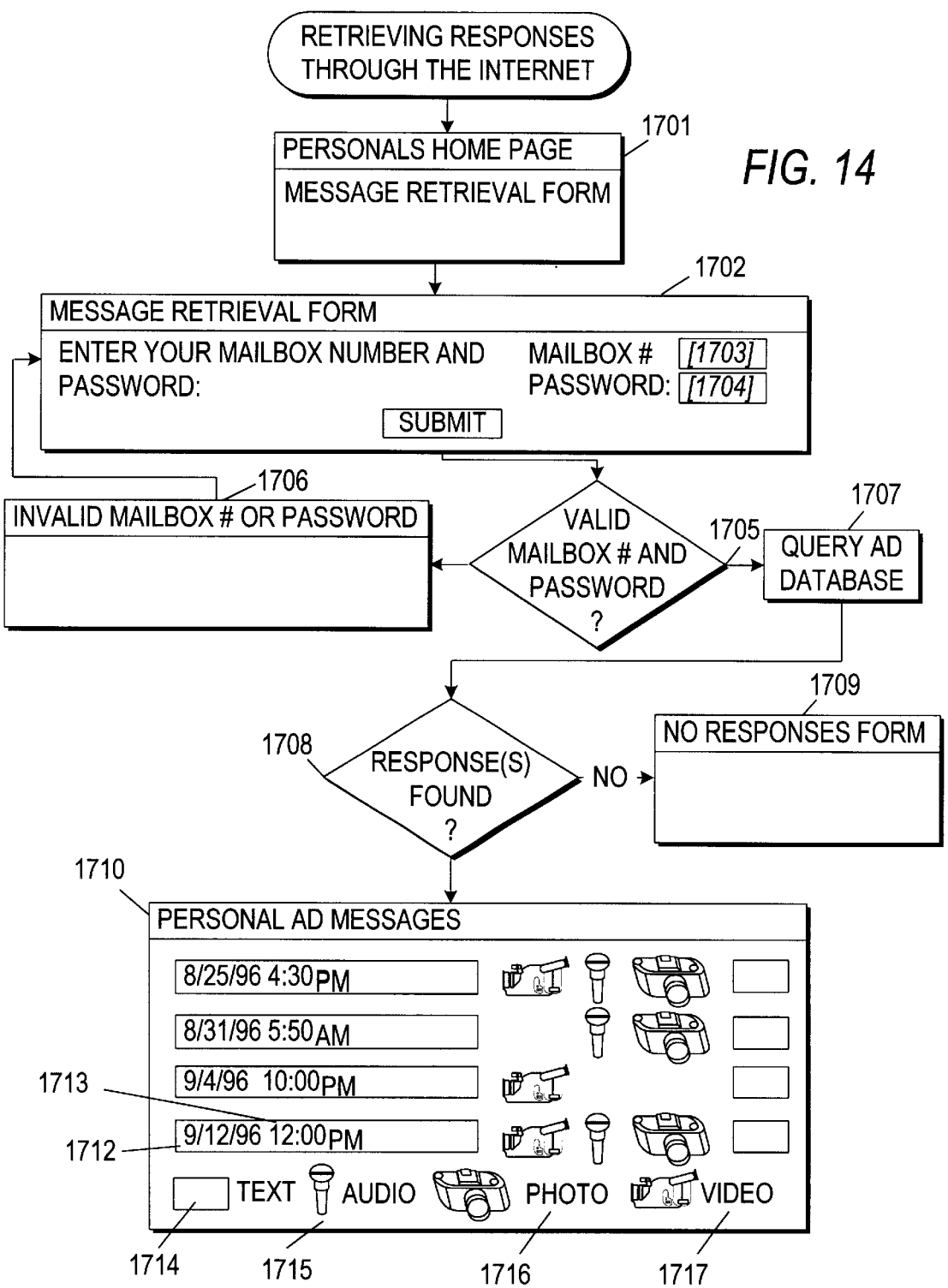
FIG. 14 shows a flow diagram of an exemplary operation of the process of retrieving responses through the Internet as accomplished by the present invention.

An exemplary operation of the system, with regard to an advertiser retrieving her messages via the Internet will now be treated to accomplish the process as indicated in FIG. 14. First, suppose an advertiser at terminal CT1 connects to the Internet to retrieve messages. The assumed Internet user connects to the Internet and inputs a Uniform Reference Locator URL resulting in a connection from the remote terminal CT1 to a Home Page 1701 on the Internet Web Server.

Referring to FIG. 14, from the Home Page 1701 on the Internet Web Server, the advertiser selects a Message Retrieval Form 1702. The Message Retrieval Form 1702 instructs the advertiser to enter a mailbox number 1703 and password 1704. The IWS then queries the Ad Database to determine if the mailbox number and password are valid 1705. If the entries are not valid, the Internet user is presented with an Invalid Mailbox and Password Form 1706. If the entries are valid 1705, the IWS queries the Ad Database 1707 to find responses to the advertiser's ad.

If there are no responses, the IWS presents the advertiser with a No Responses Form 1709. If the IWS finds one or more responses, the IWS presents the advertiser with a Personal Ad Messages Form 1710. The Personal AD Messages Form 1709 shows any messages for the advertiser. Each message shows the date 1712 and time 1713 the message was received and contains one or more icons that represent the contents of the message. A text icon 1714 denotes a text message; an audio icon 1715 denotes an audio message; a still camera icon 1716 denotes a photograph; a video camera icon 1717 denotes a video clip. By clicking on an icon, the advertiser can view or listen to the associated file.

What is claimed is:

1. A system for controlling an inventory of advertisements, wherein said system comprises:
   remote terminal apparatus;
   interface means for interfacing said remote terminal apparatus to a public communications network, said interface means including means for placing advertisements, means for placing audio recordings, and means for providing input data;
   storage means coupled to said interface means for storing said advertisements, said audio recordings and said input data;
   publication means coupled to said storage means for publishing said advertisements, said publication means including means for playing said audio recordings via the Internet; and
   control means coupled to said publication means for processing said advertisements for said publishing and for processing said input data to isolate a subset of said advertisements;
   wherein said audio recordings are associated with said advertisements.

2. A system according to claim 1, wherein said remote terminal apparatus comprises a personal computer including voice communications means or a telephone.

3. A system according to claim 1, said system further comprising means for determining which said advertisements are published.

4. A system according to claim 3, wherein a characteristic of an advertiser of at least one of said advertisements is a factor in said determining.

5. A system according to claim 3, wherein activity generated by said advertisements is a factor in said determining.

6. A system according to claim 1, wherein said system determines a sort order of said advertisements to be published.

7. A system according to claim 6, wherein a characteristic of an advertiser of at least one of said advertisements is a factor in determining said sort order.

8. A system according to claim 6, wherein activity generated by said advertisements is a factor in determining said sort order.

9. A system according to claim 1, wherein said audio recording is placed via a telephone.

10. A system according to claim 1, wherein said audio recording is placed via the Internet.

11. A system according to claim 1, wherein said system further comprises:
    means for enhancing an advertisement by placing a video recording via the Internet; and
    means for playing said video recording via the Internet.

12. A system according to claim 1, wherein said system further comprises:
    means for responding to an advertisement by sending an audio message via the Internet; and
    means for retrieving said audio message via a telephone.

13. A system according to claim 1, wherein said system further comprises:
    means for responding to said advertisement by sending an audio message via a telephone; and
    means for retrieving said audio message via the Internet.

14. A system according to claim 1, wherein said system further comprises:
    means for responding to said advertisement by sending an audio message via the Internet; and
    means for retrieving said audio message via the Internet.

15. A system according to claim 1, wherein said system further comprises:
    means for responding to said advertisement by sending a video message via the Internet; and
    means for retrieving said video message via the Internet.

16. A system according to claim 1, wherein said advertisements are published via the Internet.

17. A system according to claim 1, wherein said advertisements are published on television.

18. A system according to claim 1, wherein said advertisements are published in a printed medium.

19. A system for controlling an inventory of advertisements, wherein said system comprises:
    a remote terminal apparatus;
    interface means for interfacing said remote terminal apparatus to the Internet, said interface means including means for placing advertisements, means for placing audio recordings, and means for providing input data;
    storage means coupled to said interface means for storing said advertisements, said audio recordings and said input data;

publication means coupled to said storage means for publishing said advertisements, said publication means including means for playing said audio recordings via the Internet; and control means coupled to said publication means for processing said advertisements for said publishing and for processing said input data to isolate a subset of said advertisements;

wherein said audio recordings are associated with said advertisements.

20. A system according to claim 19, wherein said remote terminal apparatus comprises a personal computer including voice communication means.

21. A system according to claim 19, wherein said system further comprises means for responding to said advertisements by sending an audio recording via the Internet.

22. A system according to claim 19, wherein said system further comprises means for respond to said advertisements by sending a video recording via the Internet.

23. A system according to claim 19, wherein said advertisements are published via the Internet.

24. A system according to claim 19, wherein said advertisements are published on television.

25. A system according to claim 19, wherein said advertisements are published in a printed medium.

* * * * *